Patented Apr. 20, 1937

2,077,793

UNITED STATES PATENT OFFICE 2,077,793

REFRACTORY MORTAR COMPOSITION

Frederic A. Harvey and Raymond E. Birch, Pittsburgh, Pa., assignors to Harbison-Walker Refractories Company, Pittsburgh, Pa., a corporation of Pennsylvania No Drawing. Application November 24, 1934,
Serial No. 754,682

10 Claims. (Cl. 106—9)

This invention relates to refractory material for use as mortar or cement, such, for example, as used for laying up refractory shapes, or for patching refractory materials, in apparatus exposed to high temperatures, these and similar uses being comprehended by the term "mortar" and used hereinafter for brevity of reference.

No completely satisfactory and generally applicable material of the type referred to has been available. Of those previously known and used in the art some have been applicable to certain purposes, but wholly unsatisfactory for others. In general the prior compositions have been characterized by a pronounced tendency to flux, or react, with certain types of refractories, so that their applicability has been limited. Chrome ore mortars, being essentially neutral, possess certain advantages, but it has not been possible to use them where they are exposed to reducing atmospheres because in consequence of reduction of the chrome ore the mortar exhibits an excessive tendency toward softening or melting. For some purposes magnesia mortars are desirable, but at elevated temperatures they can not be used in contact with silica or highly siliceous materials, with which they react violently at temperatures as low as 1500° C., producing a fluid slag and causing corrosion of one or both types of refractory. This, of course, militates against the use of magnesia refractories with silica refractories. These and other disadvantages of prior mortars are recognized by those skilled in the art.

It is among the objects of the invention to provide refractory compositions for use as mortar or the like which are highly refractory, substantially non-reactive at ordinary furnace temperatures with substantially all of the refractory materials used commercially, are readily prepared and used, relatively inexpensive, and embody advantages not possessed by the materials previously used for the purposes contemplated.

A special object is to provide a novel mode of bonding, or binder for, refractory material.

The invention is predicated in part upon our discovery that olivine is uniquely suited for use as a refractory mortar material, particularly because to a higher extent than heretofore attained it provides the prerequisite of being non-reactive with the commercial refractory materials with which it comes in contact. We have discovered that up to temperatures even as high as 1600° C. olivine mortar does not react with the majority of the materials used in commercial refractory brick, tile, and other shapes. For instance, we have found that olivine mortar can be used in contact with chrome brick, high alumina brick (such for example, as made from diaspore, sillimanite, and the like), dolomite brick, silica brick, magnesite brick, and other refractories, without reacting with them to any material extent at temperatures at least as high as 1600° C.

This unique property of olivine is not possessed by other natural magnesium silicates such as talc, asbestos, steatite, and serpentine. These and similar magnesium silicates are of too low refractoriness for the purposes of this invention, and they possess other disadvantageous features. For instance such substances as serpentine and talc undergo dissociation when heated to about 650° C., with liberation of combined water. Further elevation of temperature produces substantial shrinkage, to the extent of more than 30 per cent of volume in the case of some of these minerals, and all of these minerals develop substantial quantities of liquid silicates at temperatures somewhat over 1500° C., which would, of course, cause corrosion of refractory materials in contact with them, and would prevent bonding. The foregoing and other properties thus render such minerals unsuited for use in the practice of this invention, and further distinguish them from olivine, which is of entirely different character as regards the behavior just discussed, and although olivine may contain small quantities of those minerals as impurities, the small quantities do not materially affect the unique property of olivine which renders it so efficacious in the practice of this invention.

The only other material known to us which can be used in contact with both magnesia and silica without reaction at high temperatures is chrome ore, but as stated hereinabove chrome ore mortars are subject to reduction with serious consequences, which precludes the use of chrome ore mortars for applications in which they are exposed to reducing atmospheres. The olivine mortars are not subject to such disadvantageous results. There being no other material known which can be used in contact with both magnesia and silica without reaction therewith, it follows that for such applications there has been available no mortar completely satisfactory for general applicability with acid, basic and neutral refractories, and that the invention adequately supplies that deficiency. Thus the mortars provided by the invention are unusually satisfactory because they embrace both high refractoriness and the ability to use them in contact with all of the common refractory materials without disadvantageous consequences resulting from their contact therewith.

This property of olivine is contrary to what would have been expected from the information available in the art. Thus, magnesia mortars will flux silica brick at temperatures of 1500° C. or lower. Since commercial refractory olivine contains an amount of magnesia ranging from about 45 per cent to 57 per cent, it would have been predicted that olivine, composed essentially of magnesium ortho-silicate, also would react readily with silica. This would be predicted also from the equilibrium diagram for the system MgO—SiO₂, from which it appears that forsterite and silica, while possessing high melting points, should mutually react and flux each other with some ease at lower temperatures. Contrary to that expectation, however, we have found that under practical conditions olivine, which may contain as much as 90 per cent or more of forsterite, does not react materially with silica brick at the temperatures ordinarily encountered in normal furnace practice.

Although olivine itself is capable of providing the characteristics upon which our invention is predicated, it can not ordinarily be used alone satisfactorily as a mortar because the sub-divided mineral lacks the plasticity and the ability to bond itself at low temperatures which are needed for such compositions. That is, a mortar should bond adequately when allowed to dry or stand at normal room temperatures, and olivine does not inherently possess the ability to bond in this manner. Our invention further provides suitable compositions containing olivine as the principal active constituent.

A variety of materials are known to supply satisfactory cold set for refractory materials such as ground quartzite or chrome ore. Characteristic agents of this class are sodium silicates, aluminous cement, sodium aluminate, and others known to those familiar with the art. While these known materials may be used in conjunction with olivine in accordance with our invention, we have found that they do not alone suffice to provide the most satisfactory mortar compositions because while they afford adequate bonding at normal temperatures, the compositions are lacking in satisfactory bonding strength throughout the entire temperature range. That is, they do not provide satisfactory bonding of bricks laid up in furnaces operated within the range of, for example 275° C. to 1150° C., which includes normal furnace operations in some industries, such as those of the lead and other non-ferrous metal industries. Mortars containing sodium silicate, for instance, lose much of their bond in this temperature range, and at temperatures in the range stated the olivine does not attain any substantial ceramic set from its content of silicate impurities. Such simple compositions, however, may be satisfactory for furnaces operated at higher temperatures, such as 1150° C. to 1300° C., since at such high temperatures the olivine refractory material will commonly attain its own ceramic set.

A further feature of this invention resides in providing compositions suitable for bonding refractories throughout the entire range from normal temperature to the temperature at which the ceramic set of the refractory materials is attained, which compositions are useful with refractories generally, and particularly for bonding compositions containing olivine as the major refractory constituent in accordance with the invention. To this end we provide a material capable of producing satisfactory cold set and adapted to cooperate with another bond-producing material to provide satisfactory bonding at intermediate temperatures. Preferably we use a cold setting agent and another bond-producing material which will react to form a viscous glass at intermediate temperatures, i. e., at temperatures above normal temperature but below those at which the ceramic set of the refractory occurs. Certain types of glasses may not be suitable for all purposes, such as lead silicate glasses, because lead oxide is readily reduced to metallic lead, but we have satisfactorily used boro-silicate glasses, which we believe to be especially satisfactory for the purposes of our invention. These bonding compositions are mixed with the refractory to be bonded, such as olivine.

As an example of the practice of the invention, reference may be made to a composition which has been found to satisfactorily embrace both aspects of the invention. This consists of 80 per cent of olivine and 20 per cent of bonding material of the following composition:

25% of colemanite
35% of dry sodium silicate (Na₂O:SiO₂ ratio 1:3.25)
20% of Pennsylvania kaolin (61% SiO₂, 25% Al₂O₃)
20% of potters' flint.

In a composition as just described the olivine acts as the stable refractory constituent of the mortar, and it will be observed that it constitutes the major proportion of the composition in the example given. Referring to the bonding material, which is present in minor amount, the sodium silicate provides a very strong cold set which effects bonding of the brick very tightly at room temperatures. At temperatures in the vicinity of 540° C. to 800° C. the sodium silicate, which at such temperature loses much of its cold set, will combine with the remaining elements of the bonding material to form a viscous glass which then acts to bond the refractory grains until the composition reaches the temperature at which the normal ceramic set of the refractory, olivine in this instance, begins to function in producing a permanent bond in the mortar.

The foregoing composition is given by way of example, and not of limitation, it being possible to compound suitable bonding compositions other than the specific one just given. For instance, the foregoing bonding material when reduced to molecular equivalents is of approximately the following composition:

|  | Mol. |
|---|---|
| CaO | 0.448 |
| Na₂O | 0.552 |
| Al₂O₃ | 0.18 |
| SiO₂ | 3.55 |
| B₂O₃ | 0.672 |

This satisfactory bonding material may obviously be prepared from other minerals and substances than those referred to specifically. Likewise, other compositions including an element providing satisfactory cold set and reactive with other constituents to form a viscous glass at intermediate temperatures will be capable of being compounded by those skilled in the art.

Thus, as one of the other glass forming agents which cooperate with the cold setting agent to form the intermediate bond, feldspar could be used, as well as other fluxes of similar nature. Instead of colemanite there may be used other colemanite, sodium silicate, kaolin and flint, and characterized by resistance to reaction in contact with silica, chrome, magnesia and alumina refractories at high temperatures.

2. A refractory mortar containing olivine as its principal refractory ingredient and containing also a minor proportion of material supplying viscous and deformation-resistant glass at intermediate temperatures to temperatures at which the mortar attains its ceramic set, and the mortar being resistant to reaction in contact with silica, chrome, magnesia, and alumina refractories at temperatures as high as 1600° C.

3. A refractory mortar containing olivine as its principal refractory ingredient and containing also a minor proportion of a temporary binder and material supplying viscous and deformation-resistant glass at intermediate temperatures to temperatures at which the mortar attains its ceramic set, and the mortar being resistant to reaction in contact with silica, chrome, magnesia, and alumina refractories at temperatures as high as 1600° C.

4. A refractory mortar containing a major proportion of olivine as its principal refractory ingredient and containing also a minor proportion of material supplying viscous and deformation-resistant boro-silicate glass at intermediate temperatures to temperatures at which the mortar attains its ceramic set, and the mortar being resistant to reaction in contact with silica, chrome, magnesia, and alumina refractories at temperatures as high as 1600° C.

5. A refractory mortar containing a major proportion of olivine, and a minor proportion of bonding material comprising a temporary binder effective at normal temperatures, and material reactive with said temporary binder to form a glass bond viscous and deformation-resistant at intermediate temperatures to temperatures at which the mortar attains its ceramic set, and the mortar being resistant to reaction in contact with silica, chrome, magnesia and alumina refractories at temperatures as high as 1600° C.

6. A refractory mortar containing a major proportion of olivine, and a minor proportion of bonding material comprising sodium silicate and material reactive with said silicate to form a glass bond viscous and deformation-resistant at intermediate temperatures to temperatures at which the mortar attains its ceramic set, and the mortar being resistant to reaction in contact with silica, chrome, magnesia and alumina refractories at temperatures as high as 1600° C.

7. A refractory mortar containing a major proportion of olivine, and a minor proportion of bonding material comprising sodium silicate and material reactive with said silicate to form a boro-silicate glass bond viscous and deformation-resistant at intermediate temperatures to temperatures at which the mortar attains its ceramic set, and the mortar being resistant to reaction in contact with silica, chrome, magnesia and alumina refractories at temperatures as high as 1600° C.

8. A refractory mortar containing a mixture of olivine and magnesia as its principal refractory ingredient and containing also a minor proportion of material supplying viscous and deformation-resistant glass at intermediate temperatures to temperatures at which the mortar attains its ceramic set, and the mortar being resistant to reaction in contact with silica, chrome, magnesia, and alumina refractories at temperatures as high as 1600° C.

9. A refractory mortar containing a major proportion of a mixture of olivine and magnesia, and a minor proportion of bonding material comprising a temporary binder effective at normal temperatures, and material reactive with said temporary binder to form a glass bond viscous and deformation-resistant at intermediate temperatures to temperatures at which the mortar attains its ceramic set, and the mortar being resistant to reaction in contact with silica, chrome, magnesia and alumina refractories at temperatures as high as 1600° C.

10. A refractory mortar containing a major proportion of olivine and magnesia, and a minor proportion of bonding material comprising sodium silicate, and material reactive with said silicate to form a glass bond viscous and deformation-resistant at intermediate temperatures to temperatures at which the mortar attains its ceramic set, and the mortar being resistant to reaction in contact with silica, chrome, magnesia and alumina refractories at temperatures as high as 1600° C.

FREDERIC A. HARVEY.
RAYMOND E. BIRCH.

compounds of boron, calcium being supplied, when necessary, in other forms, such as whiting or other forms of calcium salts available for the purpose. Instead of using the kaolin referred to, other clays can be used, or the clay can be eliminated entirely, because it is not relied upon to confer plasticity. If the kaolin is eliminated it may be replaced, for example, by pulverized silica, such as that commonly referred to as potter's flint. As just noted, the identity and amount of these glass-forming agents used will depend upon the particular molecular composition desired in the glass, and upon economic considerations.

Olivines composed largely of magnesium orthosilicate appear in general to provide the benefits conferred by this invention, but by way of example it may be noted that satisfactory results are obtained with olivines of approximately the following composition:

| | Per cent |
|---|---|
| $SiO_2$ | 42 |
| MgO | 48 |
| FeO, etc. | 10 |

Various materials may likewise be used as the cold setting agents, due attention being given to the fact that in accordance with this aspect of the invention these agents not only afford a cold set, or bond, at normal temperatures, but also that they enter into reaction with other ingredients of the bonding material to form a viscous glass at intermediate temperatures. In addition to sodium silicate there may be used for this purpose materials such as sodium aluminate, sodium sulfate, magnesium compounds, such as caustic magnesite or magnesium chloride, and aluminous cements, a typical composition of the latter being as follows:

| | Per cent |
|---|---|
| $SiO_2+MgO$ | 3 to 5 |
| $Al_2O_3$ | 42 |
| CaO | 40 |
| $Fe_2O_3$ | 13 to 15 |

In a modified embodiment of the invention there may be used a bonding composition of sodium silicate, or other cold setting material, together with powdered glass of suitable composition. In this embodiment of the invention the sodium silicate not only provides cold set, but also reacts with the glass to lower its melting temperature to a range useful for its intended purpose. The sodium silicate is desirable because otherwise the viscous glass bond would not become effective within a suitable range of temperature, the usual range of glass softening temperature being normally too high for this purpose.

Usually it will be desirable, and in some instances necessary, to use a plasticizing agent, of which gum arabic is a suitable example. The purpose of this agent is to render the mortar workable. Using gum arabic, about 0.5 per cent suffices.

In the practice of the invention the compositions are made up in ways which will be understood by those familiar with this art. Generally speaking, the constituents of the composition may be charged together in a pulverizing machine, using any one of the customary types. Excessively coarse material may be separated through the use of an air classifier, or the materials can be screened to remove excessively coarse particles, which are returned to the crusher. For trowelling purposes screens having 30 meshes per linear inch will be satisfactory, and for other uses the grind will be varied according to need and the particular mode of using the material, as will be understood by those skilled in the art.

If desired for any purpose, the cold setting agent can be chosen to provide for the mortar to be shipped wet instead of dry. Thus, sodium silicate may be used either dry or wet, depending on the condition in which it is desired to ship the mortar. If the material is to be shipped wet it may be advisable to add water to the batch, in preparing the composition, to give it sufficient fluidity.

Although in the example given 20 per cent of bonding material was used, it will be understood that more or less may be used, depending on the composition and the intended use, although for all purposes the refractory constitutes the major portion of the mortar. A surprising feature of this invention resides in the fact that the glass-forming materials can be used in amounts at least up to about 25 per cent of the mortar without excessively lowering its refractoriness. We have found, for example, that such mortars are still strong and load resisting at temperatures of 1700° C. This is contrary to most experience with melted silicates, and, in general, with glass-forming constituents in refractories, since ordinarily a much smaller percentage of silicate impurities in a refractory brick is sufficient to cause the brick to yield or crush under loads as light as 25 pounds per square inch, in some cases at temperatures as low as 1315° C. For instance, chrome brick in which the natural silicates (which constitute the only glass-forming materials present in appreciable amounts) exist in amounts as low as 10 per cent, are often found to collapse under a load of the order mentioned within the temperature range 1315° to 1430° C. While the reason for the ability to retain strength even in the presence of large amounts of glass is not fully understood by us, we believe that it may be due to the fact that the glass dissolves an amount of olivine to maintain a constantly viscous condition throughout the range of temperatures used in industrial furnaces.

Although in the preceding description reference has been made to compositions composed essentially of olivine and bonding material, the invention is applicable equally to compositions in which a portion of the olivine is replaced by another refractory material which does not adversely affect the refractoriness and inertness of the olivine refractory, of which dead-burned magnesite and chrome ore are examples. We have found, for instance, that up to 30 per cent of the active refractory material can be replaced by such magnesite without affecting to a serious extent the excellent properties which characterize the mortars provided by this invention, particularly the non-reactive character of the straight olivine mortars in contact with silica brick at high temperatures.

According to the provisions of the patent statutes, we have explained the principle and mode of applying our invention, and have described what we now consider to represent its best embodiment. However, we desire to have it understood that, within the scope of the appended claims, the invention may be practiced otherwise than as specifically described.

We claim:

1. A refractory mortar containing a major proportion of olivine, and a minor proportion of bonding material comprising an admixture of